US010817741B2

(12) United States Patent
Zhou et al.

(10) Patent No.: US 10,817,741 B2
(45) Date of Patent: Oct. 27, 2020

(54) WORD SEGMENTATION SYSTEM, METHOD AND DEVICE

(71) Applicant: Alibaba Group Holding Limited, Georgetown, Grand Cayman (KY)

(72) Inventors: Wenmeng Zhou, Hangzhou (CN); Mengli Cheng, Hangzhou (CN); Xudong Mao, Hangzhou (CN); Xing Chu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 43 days.

(21) Appl. No.: 16/081,011

(22) PCT Filed: Feb. 16, 2017

(86) PCT No.: PCT/CN2017/073718
§ 371 (c)(1),
(2) Date: Aug. 29, 2018

(87) PCT Pub. No.: WO2017/148265
PCT Pub. Date: Sep. 8, 2017

(65) Prior Publication Data
US 2019/0019055 A1 Jan. 17, 2019

(30) Foreign Application Priority Data

Feb. 29, 2016 (CN) .......................... 2016 1 0112463

(51) Int. Cl.
*G06K 9/34* (2006.01)
*G06N 3/04* (2006.01)
(Continued)

(52) U.S. Cl.
CPC ............... *G06K 9/344* (2013.01); *G06K 9/34* (2013.01); *G06K 9/6214* (2013.01);
(Continued)

(58) Field of Classification Search
CPC ...... G06K 2209/01; G06K 9/34; G06K 9/344; G06K 9/6214; G06N 5/046; G06T 7/10
See application file for complete search history.

(56) References Cited

U.S. PATENT DOCUMENTS 5,570,435 A 10/1996 Bloomberg et al.
6,975,761 B1 12/2005 Swann et al.
(Continued)

FOREIGN PATENT DOCUMENTS

CN 102254157 A 11/2011
CN 102822846 A 12/2012
(Continued)

*Primary Examiner* — Said M Elnoubi

(57) ABSTRACT

In an optical character recognition system, a word segmentation method, comprising: acquiring a sample image comprising a word spacing marker or a non-word spacing marker; processing the sample image with a convolutional neural network to obtain a first eigenvector corresponding to the sample image, a word spacing probability value and/or a non-word spacing probability value corresponding to the first eigenvector; acquiring a to-be-tested image, and processing the to-be-tested image with the convolutional neural network to obtain a second eigenvector corresponding to the to-be-tested image, a word spacing probability value or a non-word spacing probability value corresponding to the second eigenvector; and performing word segmentation on the to-be-tested image by using the just obtained word spacing probability value or the non-word spacing probability value. In embodiments, word segmentation can be performed accurately, so that accuracy and speed of the word segmentation are improved, and user's experience is enhanced.

12 Claims, 7 Drawing Sheets

(51) Int. Cl.
  *G06N 3/08*   (2006.01)
  *G06T 7/10*   (2017.01)
  *G06K 9/62*   (2006.01)
  *G06N 5/04*   (2006.01)

(52) U.S. Cl.
  CPC .............. *G06N 3/0454* (2013.01); *G06N 3/08* (2013.01); *G06N 5/046* (2013.01); *G06T 7/10* (2017.01); *G06K 2209/01* (2013.01)

(56) References Cited

U.S. PATENT DOCUMENTS

| | | |
|---|---|---|
| 7,082,219 B2 | 7/2006 | Bourbakis et al. |
| 7,110,568 B2 | 9/2006 | Arcas-Luque et al. |
| 7,376,272 B2 | 5/2008 | Fan et al. |
| 7,471,826 B1 | 12/2008 | Navon et al. |
| 7,529,407 B2 | 5/2009 | Marquering et al. |
| 8,098,936 B2 | 1/2012 | Guerzhoy et al. |
| 8,649,600 B2 | 2/2014 | Saund |
| 8,768,057 B2 | 7/2014 | Saund |
| 8,965,127 B2 | 2/2015 | Wu et al. |
| 9,058,517 B1* | 6/2015 | Collet .................. G06K 9/6249 |
| 9,384,409 B1 | 7/2016 | Ming |
| 9,430,703 B2 | 8/2016 | Ming |
| 9,530,069 B2 | 12/2016 | Manmatha et al. |
| 2011/0243445 A1* | 10/2011 | Uzelac .................. G06K 9/342 382/177 |
| 2015/0055866 A1 | 2/2015 | Cummins et al. |

FOREIGN PATENT DOCUMENTS

| | | |
|---|---|---|
| CN | 103530600 A | 1/2014 |
| CN | 104050471 A | 9/2014 |
| CN | 104463241 | 3/2015 |
| CN | 105469053 A | 4/2016 |
| EP | 0905643 A2 | 3/1999 |
| EP | 2545492 A2 | 1/2013 |
| WO | WO2011126775 A2 | 10/2011 |
| WO | WO2016197381 A1 | 12/2016 |

* cited by examiner

FIG. 4

WORD SEGMENTATION SYSTEM, METHOD AND DEVICE

The present application claims priority to China Patent Application No. 201610112463.6, titled "Word Segmentation Method and Device", filed Feb. 29, 2016, and corresponding to PCT Application No. PCT/CN2017/073718 filed Feb. 16, 2017 and WIPO Patent Publication No. 2017148265A1 dated Sep. 8, 2017, all of which are incorporated herein by reference in their entirety.

TECHNICAL FIELD

The present application relates to the field of Internet technology and, in particular, to a word segmentation method, system and device.

BACKGROUND

Optical Character Recognition ("OCR") refers to a process of using an electronic device to check characters printed on a paper, determine their shape by detecting bright and dark patterns; and then a character recognition method is used to translate shapes into a computer text. That is, it is a technology for converting printed characters on a paper document into a black-and-white dot matrix image file in an optical manner; and the text in the image is converted into a text format with a recognition software for further editing and processing by a word processing software. Thus, text images can be converted into digits based on the OCR technology.

Although the OCR technology has been relatively mature, it is still difficult to fast and accurately detect the text area in the image due to many factors such as complex image background, various text fonts, sizes, and colors in the image, different shooting angles, and influence of different lighting.

SUMMARY

The present invention provides for a word segmentation method, system and a device to perform word segmentation on an image, making it possible to fast and accurately detect the text area in the image, thereby improving user experience. In an embodiment, the present invention is described as follows: in an OCR system, a word segmentation method, the method comprising the steps of:

acquiring a sample image, the sample image comprising a word spacing marker or a non-word spacing marker; processing the sample image with a convolutional neural network to obtain a first eigenvector corresponding to the sample image, a word spacing probability value and/or a non-word spacing probability value corresponding to the first eigenvector;

acquiring a to-be-tested image, and processing the to-be-tested image with the convolutional neural network to obtain a second eigenvector corresponding to the to-be-tested image, a word spacing probability value or a non-word spacing probability value corresponding to the second eigenvector; and performing word segmentation on the to-be-tested image by using the just obtained word spacing probability value or the non-word spacing probability value.

In an embodiment, the step of acquiring a sample image comprises: extracting at least two letter images from a font library, splicing the at least two letter images together to obtain a spliced image, and setting a word spacing marker or a non-word spacing marker for the spliced image; marking the spliced image as the sample image or performing one of the following operations or any combination thereof on the spliced image: a translation operation, a rotation operation, a stretching operation, adding Gaussian noise, and marking the image on which the operation is performed as the sample image.

In an embodiment, the method further comprises: before processing the sample image with the convolutional neural network, converting the sample image into a gray scale sample image, converting the gray scale sample image into a sample image with a size of M*N, and normalizing the sample image with the size of M*N; before processing the to-be-tested sample image with the convolutional neural network, converting the to-be-tested image into a gray scale, to-be-tested image, converting the gray scale, to-be-tested image into a to-be-tested image with a size of M*L, and normalizing the to-be-tested image with the size of M*L, wherein the number M is a positive integer, the number N is a positive integer, and L is a positive integer; and a ratio of the number M and the number L is the same as an aspect ratio of the to-be-tested image.

In an embodiment, the processing the to-be-tested image with the convolutional neural network to obtain a second eigenvector corresponding to the to-be-tested image comprises:

translating the to-be-tested image to the left K times or to the right K times, wherein each translation has a different translational position so that K+1 different to-be-tested images are obtained, and the number K is a positive integer; and processing the different K+1 to-be-tested images with the convolutional neural network to obtain K+1 eigenvectors corresponding to the to-be-tested images, and combine the obtained K+1 eigenvectors respectively corresponding to the to-be-tested images to obtain a second eigenvector corresponding to the to-be-tested image.

In an embodiment, the process of obtaining the word spacing probability value or non-word spacing probability value corresponding to the second eigenvector comprises: obtaining a plurality of first eigenvectors matching the second eigenvector by using the convolutional neural network, and taking the word spacing probability value or the non-word spacing probability value corresponding to the plurality of first eigenvectors as the word spacing probability value or the non-word spacing probability value corresponding to the second eigenvector.

In an embodiment, the performing word segmentation on the to-be-tested image by using the just obtained word spacing probability value or the non-word spacing probability value comprises: obtaining a probability value result graph by using a position of the to-be-tested image corresponding to the second eigenvector as an X coordinate and using the word spacing probability value corresponding to the second eigenvector as a Y coordinate; finding a position of a maximum value of the word spacing probability value from the probability value result graph, and performing word segmentation on the to-be-tested image by using the maximum value position; alternatively, obtaining the probability value result graph by taking the position of the to-be-tested image corresponding to the second eigenvector as the X coordinate and taking the non-word spacing probability value corresponding to the second eigenvector as the Y coordinate; finding a position of a minimum value of the non-word spacing probability value from the probability value result graph, and performing word segmentation on the to-be-tested image by using the minimum value position.

In an embodiment, the present invention provides for a word segmentation device, comprising:

a training module configured to acquire a sample image, the sample image comprising a word spacing marker or a non-word spacing marker; process the sample image with a convolutional neural network to obtain a first eigenvector corresponding to the sample image, a word spacing probability value and/or a non-word spacing probability value corresponding to the first eigenvector; and a predicting module configured to acquire a to-be-tested image and process the to-be-tested image with the convolutional neural network to obtain a second eigenvector corresponding to the to-be-tested image, a word spacing probability value or a non-word spacing probability value corresponding to the second eigenvector; and perform word segmentation on the to-be-tested image by using the just obtained word spacing probability value or the non-word spacing probability value.

In an embodiment, the training module is configured to extract at least two letter images from a font library in a process of acquiring the sample image, splice the at least two letter images together to obtain a spliced image, and set a word spacing marker or a non-word spacing marker for the spliced image; and mark the spliced image as the sample image or perform one of the following operations or any combination thereof on the spliced image: a translation operation, a rotation operation, a stretching operation, adding Gaussian noise, and mark the image on which the operation is performed as the sample image.

In an embodiment, the training module is further configured to do the following: before the sample image is processed with the convolutional neural network, convert the sample image into a gray scale sample image, convert the gray scale sample image into a sample image with a size of M*N, and normalize the sample image with the size of M*N; and the predicting module is further configured to do the following: before the to-be-tested sample image is processed with the convolutional neural network, convert the to-be-tested image into a gray scale, to-be-tested image, convert the gray scale, to-be-tested image into a to-be-tested image with a size of M*L, and normalize the to-be-tested image with the size of M*L, wherein the number M is a positive integer, the number N is a positive integer, and L is a positive integer; and a ratio of the number M and the number L is the same as an aspect ratio of the to-be-tested image.

In an embodiment, the predicting module is configured to do the following: process the to-be-tested image with the convolutional neural network to obtain a second eigenvector corresponding to the to-be-tested image, translate the to-be-tested image to the left K times or to the right K times, wherein each translation has a different translational position so that K+1 different to-be-tested images are obtained, and the number K is a positive integer; and process the different K+1 to-be-tested images with the convolutional neural network to obtain K+1 eigenvectors corresponding to the to-be-tested images, and combine the obtained K+1 eigenvectors respectively corresponding to the to-be-tested images to obtain a second eigenvector corresponding to the to-be-tested image.

In an embodiment, the predicting module is configured to do the following: in a process of obtaining the word spacing probability value or the non-word spacing probability value corresponding to the second eigenvector, obtain a plurality of first eigenvectors matching the second eigenvector by using the convolutional neural network, and take the word spacing probability value or the non-word spacing probability value corresponding to the plurality of first eigenvectors as the word spacing probability value or the non-word spacing probability value corresponding to the second eigenvector.

In an embodiment, the predicting module is configured to do the following: in a process of performing word segmentation on the to-be-tested image by using the just obtained word spacing probability value or non-word spacing probability value, obtain a probability value result graph by using a position of the to-be-tested image corresponding to the second eigenvector as an X coordinate and using the word spacing probability value corresponding to the second eigenvector as a Y coordinate; find a position of a maximum value of the word spacing probability value from the probability value result graph, and perform word segmentation on the to-be-tested image by using the maximum value position; alternatively, obtain the probability value result graph by taking the position of the to-be-tested image corresponding to the second eigenvector as the X coordinate and taking the non-word spacing probability value corresponding to the second eigenvector as the Y coordinate; find a position of a minimum value of the non-word spacing probability value from the probability value result graph, and perform word segmentation on the to-be-tested image by using the minimum value position.

In embodiments of the present invention, word segmentation on an image is performed with the convolutional neural network, which can effectively segment an image having a plurality of words into a plurality of small images to ensure that each small image contains only one word; and one single word will not be segmented into a plurality of small images, thereby achieving accurate word segmentation. As a result, the present invention is able to improve the accuracy of word segmentation, increase the speed of word segmentation, and implement a fast and accurate detecting of the text areas in an image, which in turn improves the user experience.

BRIEF DESCRIPTION OF THE DRAWINGS

The drawings described below are embodiments of the invention disclosed in the present application and, as can be appreciated, those of ordinary skill in the art can obtain equivalent drawings based on these drawings.

FIG. 4 is a schematic diagram of a sample image according to an embodiment of the present invention;

DETAILED DESCRIPTION

Figure 1:
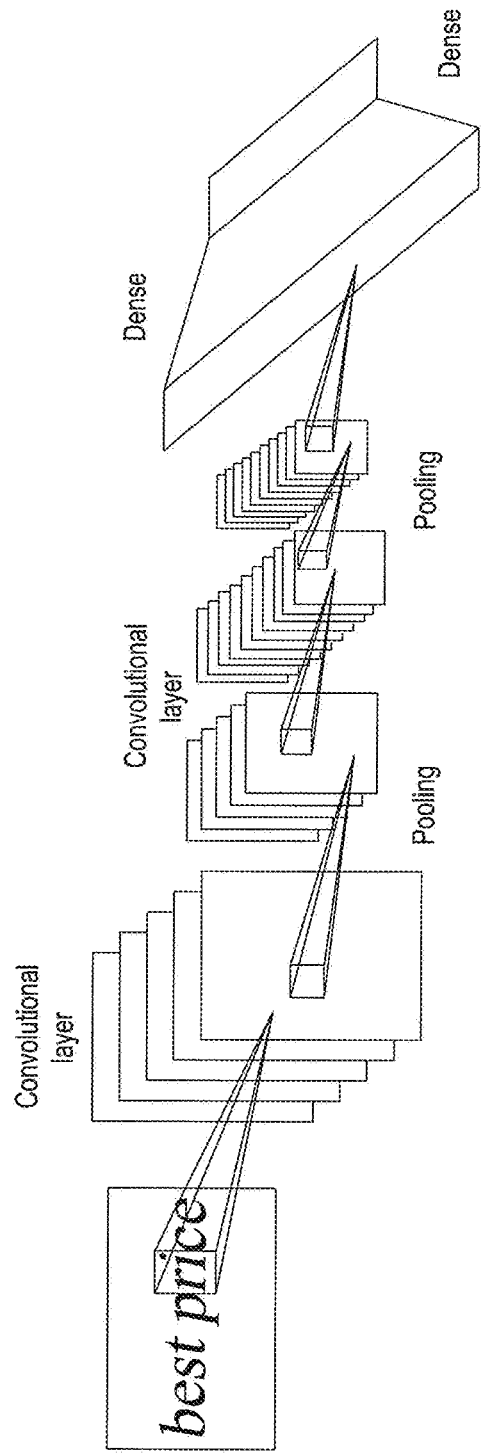
FIG. 1 and FIG. 2 are structural diagrams of a convolutional neural network according to an embodiment of the present invention

Terms used in the present application are for the purpose of describing particular embodiments only and are not intended to limit the present invention. Thus, e.g., as used in this application and in the claims, the singular forms "a", "an", and "the" are intended to include the plural forms as well, unless the context clearly indicates otherwise. It should also be understood that the term "and/or" as used herein refers to and encompasses any or all possible combinations of one or more of the associated listed items.

Although various types of information may be described using terms such as first, second, and third in the present application, such information should not be limited by these terms. These terms are only used to distinguish the information of the same type from one another. For example, first information may also be referred to as second information; and similarly, second information may also be referred to as first information without departing from the scope of the present invention. Additionally, depending on the context, the word "if" as used herein may be construed to mean "when . . . " or "upon . . . " or "in response to determining".

In order to detect text areas from an image, such as segmenting an English word from a single line text of an image, a known technique with the following steps may be performed: Step 1. Convert the image into a gray scale image. Step 2: Perform median filtering for the gray scale image. Step 3: Perform binarization processing for the median filtered image; mark the image with connected components, and take the connected areas as preliminary candidate areas for texts. Step 4: Set an excluding decision condition according to prior knowledge of the text in the image; and exclude non-text candidate areas based on the features such as text similarity, the width and height of text strokes in the candidate areas for texts. Step 5: Perform morphological closure for the candidate areas not excluded in Step 4; identify the text areas with the convolutional neural network, and exclude the non-text areas. Step 6. Perform a calculation based on the spacing between the text areas; if the spacing between adjacent areas is greater than a distance threshold set manually, the two areas are separated.

In the above implementation, binarization has very poor reliability for images with a complex background. Mistakes easily occur, resulting in errors in subsequent results. Moreover, this method introduces a great extent of prior artificial knowledge and rules. For example, the decision condition is set by making use of the prior knowledge of a text; the candidate areas for texts are excluded by making use of the width and height of the text strokes; all of these features would change along with the change of the background scenes. It is therefore very difficult to apply artificial rules to all the scenes. Moreover, the word segmentation of this method is determined by manually setting a threshold value for spacing between words; and it is easy to segment a word with a larger word spacing.

To solve the above problems, embodiments of the present invention provides a system comprising a word segmentation method, wherein: word segmentation on an image is performed with the convolutional neural network, which can effectively segment an image having a plurality of words into a plurality of small images to ensure that each small image contains only one word; and one single word will not be segmented into a plurality of small images, thereby achieving accurate word segmentation. As a result, the present invention is able to improve the accuracy of word segmentation, increase the speed of word segmentation, and implement a fast and accurate detecting of the text areas in an image, which in turn improves the user experience. Compared to the prior art, by the present invention, there is no need to binarize the image, so as to increase the reliability of the algorithm and avoid the erroneous result caused by the binarization process. In addition, there is no need to introduce a great amount of prior artificial knowledge and rules. Spacing between words can be recognized automatically with a lot of sample images provided to the convolutional neural network. This method is thus completely data-driven and requires no manual intervention. Moreover, because of the acceleration with the convolutional neural network, the recognition speed is fast and the recognition accuracy is ensured.

The convolutional neural networks referred to in embodiments of the present invention are full convolutional neural networks.

In embodiments of the present invention, in order to complete word segmentation, it is necessary to design an effective convolutional neural network and use the convolutional neural network to perform word segmentation. FIG. 1 is a schematic structural diagram of a convolutional neural network. The input of the convolutional neural network is a two-dimensional image, and its output is a word spacing probability value and/or a non-word spacing probability value. For example, the output of the convolutional neural network can be two nerve cells, in which one nerve cell outputs a word spacing probability value, indicating the probability value of the current image being a word spacing; and the other nerve cell outputs a non-word spacing probability value, indicating the probability value of the current image not being a word spacing. In addition, the structural unit of the convolutional neural network may include a convolutional layer, a pooling, and a dense, etc.

In the convolutional layer, convolution operation is carried out on an image with a convolution kernel to strengthen the image feature; the convolutional layer performs convolutional operation by using the convolutional kernel within the space. The convolutional kernel can be a matrix with a size of m*n; the output of the convolutional layer can be obtained by convolving the input of the convolutional layer with the convolutional kernel. Convolution operation is a filtering process. In a convolution operation, the gray scale value f (x, y) of a point (x, y) on the image is convolved with the convolutional kernel w (x, y). For example, a 4*4 convolution kernel containing 16 values is provided. These 16 values can be configured to any value as desired. A plurality of 4*4 sliding windows can be obtained by sliding on the image in sequence based on the size of 4*4; a plurality of convolutional features can be obtained by convolving the 4*4 convolutional kernel with each sliding window. These convolutional features are the output of the convolutional layer and are provided to the pooling.

In the pooling, the process is a down-sampling process, in which the amount of calculation is reduced and the features are maintained through operations like taking the maximum value, the minimum value, and the average value, and the like on a plurality of convolutional features (output of the convolutional layer). In the pooling, sub-sampling of the image is carried out using the image local correlation principle, so as to reduce data processing amount and maintain useful information. In one example, a pooling processing on the convolutional features can be carried out with the following formula:

$$y^i_{j,k} = \max_{0 \leq m,n < s} \{x_{j \square s+m, k \square s+n}\}$$

so as to obtain the features after the pooling processing, where s means the window size (s*s) during a corresponding pooling processing; m and n are set values, j and k are convolutional features outputted by the convolution layer, and i means the $i^{th}$ image.

After processing in the pooling, features outputted by the pooling generally can be mapped using an activation function (for example, the nonlinear function), thereby introducing a nonlinear factor to strengthen expression ability of the convolutional neural network through the combination with the nonlinear factor. The activation function includes, but is not limited to, sigmoid (S type) function and ReLU (Rectified Linear Units) function, etc. When ReLU function is taken as an example, this ReLU function can set all the features outputted by the pooling to 0 if the features are less than 0 and maintain the features that are greater than 0.

The dense is used for fully connecting all the features inputted to the dense and an eigenvector is obtained as the result; the eigenvector includes a plurality of features. Furthermore, the dense can further adopt a 1*1 convolutional layer to form a full convolutional network.

Figure 2:
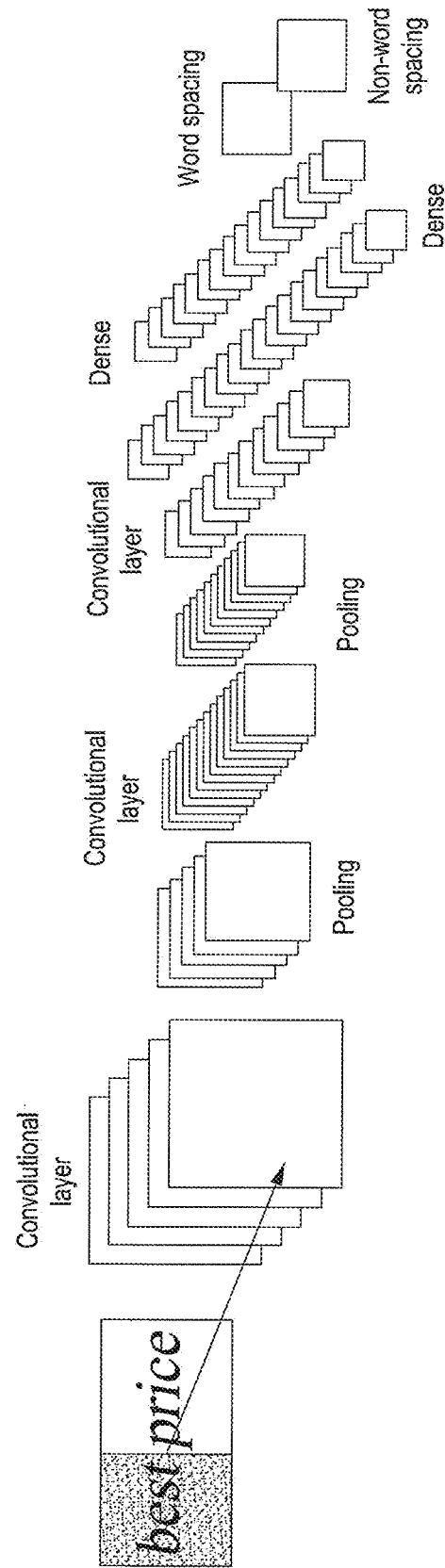

In FIG. 1, a convolutional neural network with two convolutional layers, two pooling and two dense layers are provided in an example. In an embodiment, the number of the convolution layer, pooling and dense can also be other numerical values. For example, in one embodiment, the number of convolutional layer can be three; the number of pooling can be two; and the number of dense can be two. See FIG. 2 for a network structure in detail. In FIG. 2, the convolutional neural network is formed with three convolutional layers, two pooling layers and two dense layers; and a ReLU is included after each pooling.

On the basis of the above convolutional neural network, the word segmentation system and method disclosed in embodiments of the present invention may include two stages: the first stage being a training stage and the second stage a predicting stage. In the training stage, a lot of sample images are used to train the convolutional neural network and a model with word spacing recognition capability is obtained afterwards. In the predicting stage, the convolutional neural network obtained through training predicts the currently outputted to-be-tested image, and performs word segmentation on the to-be-tested image with the predicted result.

Figure 3:
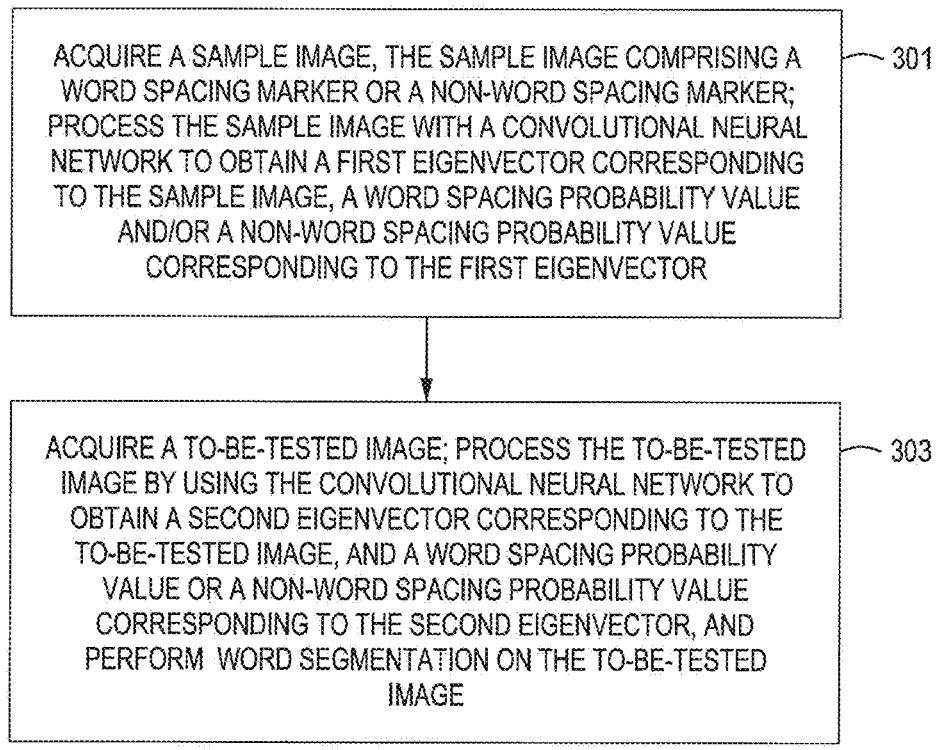
FIG. 3 is a flowchart of a word segmentation method according to an embodiment of the present invention.

Please refer to the flowchart of a word segmentation method as shown in FIG. 3. The process flow of the training stage is shown in Step 301 and the process flow of the predicting stage is shown in Step 302. Thus in FIG. 3:

Step 301 comprises: acquire a sample image, the sample image comprising a word spacing marker or a non-word spacing marker; process the sample image with a convolutional neural network to obtain a first eigenvector corresponding to the sample image, a word spacing probability value and/or a non-word spacing probability value corresponding to the first eigenvector.

Step 302 comprises: acquire a to-be-tested image, and process the to-be-tested image with the convolutional neural network to obtain a second eigenvector corresponding to the to-be-tested image, a word spacing probability value or a non-word spacing probability value corresponding to the second eigenvector; and perform word segmentation on the to-be-tested image by using the just obtained word spacing probability value or the non-word spacing probability value.

In an embodiment of the present invention, the first eigenvector and the second eigenvector are only used for distinguishing the eigenvector corresponding to the sample image and the eigenvector corresponding to the to-be-tested image. The eigenvector corresponding to the sample image is called the first eigenvector, while the eigenvector corresponding to the to-be-tested image is called the second eigenvector.

In the process of acquiring the sample image in Step 301, at least two letter images are extracted from a font library in a process of acquiring the sample image; the at least two letter images are spliced together to obtain a spliced image; and a word spacing marker or a non-word spacing marker is set for the spliced image. Then, the spliced image can be marked as the sample image; or, one or any combination of the following operations are performed on the spliced image: a translation operation, a rotation operation, a stretching operation and Gaussian noise addition; and the operated image is marked as the sample image.

After the convolutional neural network is designed, in order to train the convolutional neural network, a lot of sample images need to be acquired and each sample image go through the same processing procedure, namely, Step 301. Therefore, the processing of one sample image is used as an example. In the sample image, a word spacing marker or a non-word spacing marker needs to be set to show whether each area within the sample image is an area between words.

For example, for a sample image formed with a word A and a word B, this sample image can be AB, without a space between A and B. In this way, a non-word spacing marker can be set for the sample image, marking it as 0 for example. Alternatively, for a sample image formed with Word A and Word B, this sample image can be A B, with a space there-between. In this way, a word spacing marker can be set for the sample image.

Since a lot of sample images need to be acquired during the stage of training the convolutional neural network, it becomes implausible to set a word spacing marker or a non-word spacing marker for each sample image in an artificial way when millions of sample images are required. Therefore, in an embodiment of the present invention, at least two letter images are extracted from a font library in a process of acquiring the sample image; and the at least two letter images are spliced together to obtain a spliced image. Word spacing markers or non-word spacing markers can be directly set for the spliced image. It is therefore unnecessary to set a word spacing marker or a non-word spacing marker for each sample image in an artificial way. Thus, for example, letter image A and letter image B can be extracted from the font library; and the two letter images are spliced to form a Word AB. Assuming that there is no space in between, a non-word spacing marker is then set for this spliced image.

Figure 4:
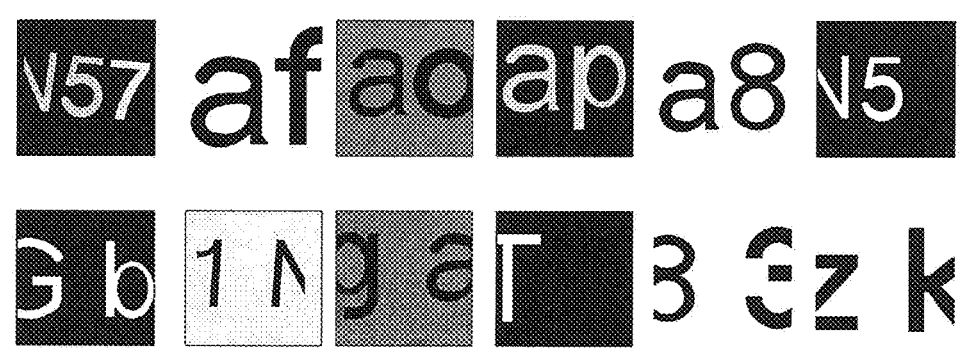

Furthermore, the spliced image can be directly marked as a sample image. Alternatively, the image quality in the font library is usually high that has no deformation or noise interference; a certain difference exists between the letter image and the acquired real image. Thus, the following operations may be randomly performed on the spliced image: a translation operation, a rotation operation and stretching operation and adding a certain degree of Gaussian noise. In this way, the image on which the operation is performed can be closer to the real image, and the image with the operation performed thereon can be marked as a sample image, as shown in FIG. 4.

In Step 301, before processing the sample image with the convolutional neural network, the sample image can be converted into a gray scale sample image with the convolutional neural network; the gray scale sample image is converted into a sample image of a size of M*N; and the sample image of the size of M*N is normalized; and the normalized sample image is inputted to the convolutional neural network for processing.

In embodiments, the number M is a positive integer and the number N is a positive integer. In one example, M and N can be 32. On this basis, the sample image acquired in Step 301 can be a sample image of a size of 32*32; when the sample image acquired in Step 301 is not a sample image of a size of 32*32, it is necessary to convert the sample image acquired in Step 301 into a sample image with the size of 32*32.

For the sample image of the size of 32*32, normalization can be further carried out with the following formula:

$$\mu = \frac{1}{n} \sum_{i=1,j=1}^{i=32,j=32} p(i,j),$$

$$\sigma = \sqrt{\frac{1}{n} \sum_{i=1,j=1}^{i=32,j=32} (p(i,j) - \mu)^2},$$

$$p'(i,j) = \frac{p(i,j) - u}{\sigma} * 128$$

where p (i, j) means a pixel value of the sample image (gray scale sample image); i means an X coordinate of the sample image; j means a Y coordinate of the sample image; and p (i, j) is the pixel value in a pixel position (i, j); n means the number of pixels after the sample image is pre-processed; p' (i, j) means the pixel value after normalization.

A reason for normalization is described as follows: because of the different input data units of the sample image, the range of some input data may be quite large. As a result, the convergence time is slow and the training time is long. Moreover, the input data with a large data scope may play an excessive role in mode classification, whereas the input data with a small data scope may play a smaller role; the input data can therefore be normalized to be mapped to an interval of [−128, +128] or other intervals.

In Step 301, the sample image can be processed by using a convolutional neural network to finally obtain a first eigenvector corresponding to the sample image, a word spacing probability value and/or a non-word spacing probability value corresponding to the first eigenvector. For example, based on the convolutional neural network shown in FIG. 2, the sample image is inputted to a convolutional layer for convolving and the convolved result is outputted to the pooling for a pooling processing; the pooling processed result is outputted to a ReLu function for mapping; and the mapped result is outputted to the convolutional layer. The same process continues until the fully connected processing can be carried out to obtain a first eigenvector and a word spacing probability value and/or a non-word spacing probability value corresponding to the first eigenvector. Details regarding the process within the convolutional neural network, is not repeated in the embodiment of the present invention. It will suffice as long as the first eigenvector and the word spacing probability value and/or non-word spacing probability value corresponding to the first eigenvector are obtained by using the convolution neural network.

In various embodiments, the convolutional neural network processes a lot of sample images, millions of sample image for example. The procedures for processing the sample image by using the convolutional neural network can be done by calling a CAFFE (Convolutional Architecture for Fast Feature Embedding) to process the sample image on a GPU (Graphics Processing Unit) cluster, namely, processing a plurality of sample images synchronously, thereby speeding up the processing speed.

On the basis of the above procedure, the convolutional neural network can be obtained through training; and the currently outputted to-be-tested image can be predicted using the convolutional neural network; and words of the to-be-tested image can be segmented.

For Step 302, in the process of acquiring the to-be-tested image, the to-be-tested image means an image needing word segmentation. Details of how the to-be-tested image is acquired are not provided herein, but can be conventional.

For Step 302, the to-be-tested image can be converted into a gray scale, to-be-tested image before processing the to-be-tested image by using the convolutional neural network. The gray scale, to-be-tested image is converted into a to-be-tested image of a size of M*L; and the to-be-tested image of the size of M*L is normalized and then inputted into the convolutional neural network.

The number M is a positive integer, and L is a positive integer; and a ratio of the number M and the number L is the same as an aspect ratio of the to-be-tested image. In an example, the number M can be 32. Assuming that the to-be-tested image obtained in Step 302 has a length of 64 and a width of 60; the to-be-tested image will be converted into a to-be-tested image of a size of 32*30, namely, L=30.

For the to-be-tested image of the size of M*L, normalization can be further carried out with the following formula:

$$\mu = \frac{1}{n} \sum_{i=1,j=1}^{i=M,j=L} p(i,j),$$

$$\sigma = \sqrt{\frac{1}{n} \sum_{i=1,j=1}^{i=M,j=L} (p(i,j) - \mu)^2},$$

$$p'(i,j) = \frac{p(i,j) - u}{\sigma} * 128,$$

where p (i, j) means a pixel value of the to-be-tested image (gray scale, to-be-tested image); i means an X coordinate of the to-be-tested image; j means a Y coordinate of the to-be-tested image, and p (i, j) is the pixel value in a pixel position (i, j); n means the number of pixels after the to-be-tested image is pre-processed; p' (i, j) means the pixel value after normalization.

The reason for normalization is described as follows: because of the different input data units of the to be-tested image, the range of some input data may be quite large. As a result, the convergence time is slow and the training time is long. Moreover, the input data with a large data scope may play an excessive role in mode classification, whereas the input data with a small data scope may play a smaller role; the input data can therefore be normalized to be mapped to an interval of [−128, +128] or other intervals.

In an embodiment, for the acquired to-be-tested image, the storage type of the to-be-tested image can be set as a floating-point type, so that the pixel value of the to-be-tested image may include the position after the decimal point. For example, when the pixel value is 1.2 and when the to-be-tested image is stored with a floating-point type, the pixel value is the real pixel value, i.e., 1.2. When the to-be-tested image is stored with other types, the pixel value may be a fake pixel value, i.e., 1.

In Step 302, the to-be-tested image can be processed by using a convolutional neural network to finally obtain a first eigenvector corresponding to the to-be-tested image, a word spacing probability value and/or a non-word spacing probability value corresponding to the first eigenvector. For example, based on the convolutional neural network shown in FIG. 2, the to-be-tested image is inputted to a convolutional layer for convolving and the convolved result is outputted to the pooling for a pooling processing; the pooling processed result is outputted to a ReLu function for mapping; and the mapped result is outputted to the convolutional layer. The same process continues until the fully connected processing can be carried out to obtain a second eigenvector and a word spacing probability value or a non-word spacing probability value corresponding to the second eigenvector. Details regarding the process within the convolutional neural network are not repeated in the embodiment of the present invention. It will suffice as long as the second eigenvector and the word spacing probability value or non-word spacing probability value corresponding to the second eigenvector are obtained by using the convolution neural network.

In an embodiment of the present invention, in the process of obtaining the word spacing probability value or non-word spacing probability value corresponding to the second eigenvector and after the second eigenvector is obtained with the convolutional neural network, a plurality of first eigenvectors matching the second eigenvector can also be obtained by using the convolutional neural network; and the word spacing probability value or non-word spacing probability value corresponding to the plurality of first eigenvectors is used as the word spacing probability value or non-word spacing probability value corresponding to the second eigenvector. The word spacing probability value corresponding to the first eigenvector is used as the word spacing probability value corresponding to the second eigenvector; and the non-word spacing probability value corresponding to the first eigenvector is used as the non-word spacing probability value corresponding to the second eigenvector.

The process of acquiring the plurality of first eigenvectors matching the second eigenvector is decided by the algorithm of the convolutional neural network itself. Details regarding this are not provided in the embodiment of the present invention, but can be conventional.

If a word spacing probability value corresponding to the first eigenvector is obtained and recorded in Step 301, then a word spacing probability value corresponding to the second eigenvector will be obtained in Step 302. If a non-word spacing probability value corresponding to the first eigenvector is obtained and recorded in Step 301, then a non-word spacing probability value corresponding to the second eigenvector will be obtained in Step 302. If a word spacing probability value and a non-word spacing probability value corresponding to the first eigenvector are obtained and recorded in Step 301, then a word spacing probability value or a non-word spacing probability value corresponding to the second eigenvector will be obtained in Step 302.

The word spacing probability value corresponding to the second eigenvector means that the position (for example, the position of the plurality of first eigenvectors corresponding to the second eigenvector in the to-be-tested image) of the to-be-tested image corresponding to the second eigenvector is a word spacing probability value. The non-word spacing probability value corresponding to the second eigenvector means that the position (for example, the position of a plurality of first eigenvectors corresponding to the second eigenvector in the to-be-tested image) of the to-be-tested image corresponding to the second eigenvector is not a word spacing probability value. For example, Position 1 on the to-be-tested image corresponding to the second eigenvector (the vertical position at the horizontal direction x=16, which shows an area of a vertical line. Here, only one position is taken for example) is the location of "e" in the word "best" on the to-be-tested image. Assuming that the word spacing probability value corresponding to the second eigenvector is 5%, it means that the probability value of position 1 being word spacing is 5%. Assuming that the non-word spacing probability value corresponding to the second eigenvector is 98%, it means that the probability value of position 1 being not word spacing is 98%.

For Step 302, in the process of obtaining the second eigenvector corresponding to the to-be-tested image by using the convolutional neural network to process the to-be-tested image, the to-be-tested image can be translated to the left for K times or to the right for K times; each translation has a different translational position so that K+1 different to-be-tested images are obtained, wherein K is a positive integer. The different K+1 to-be-tested images are processed with the convolutional neural network to obtain K+1 eigenvectors corresponding to the to-be-tested images; and the obtained K+1 eigenvectors respectively corresponding to the to-be-tested images are combined to obtain a second eigenvector corresponding to the to-be-tested image.

In an embodiment, the procedure of pooling processing is actually a de-sampling (down-sampling) process. A large amount of features of the to-be-tested image are simplified into a small amount of features by performing operations on a plurality of features, including taking the maximum value, the minimum value, the average value, etc. As a result, the number of the outputted features is much smaller than the number of the features of the to-be-tested image. For example, if the to-be-tested image has 1000 features, there will be only 50 features included in the second eigenvector after processing the to-be-tested image by using the convolutional neural network. As such, the finally obtained second eigenvector cannot fully show all the features of the to-be-tested image. As a result, in the embodiment, the to-be-tested image can be translated to the left for K times or to the right for K times, so as to obtain K+1 different to-be-tested images. After the different K+1 to-be-tested images are processed with the convolutional neural network, K+1 eigenvectors corresponding to the to-be-tested images can be obtained; and the obtained K+1 eigenvectors respectively corresponding to the to-be-tested images are combined to obtain a second eigenvector corresponding to the to-be-tested image. In this way, the number of features is increased, and the second eigenvector can be used for showing all the features of the to-be-tested image. For example, when K is 19, 50*20 features can be included in the second eigenvector.

In what follows, the to-be-tested image is translated to the left for K times, where K is 5 is used as an example. For to-be-tested Image 1 of a size of 32*30, it becomes an image of a size of 31*30 after being translated to the left for one pixel; and to-be-tested Image 2 of a size of 32*30 is obtained by adding one column data after the far right of the 31*30 image; and the column data added after the far right can be the same as that of the 31st column data in the 31*30 image. For the to-be-tested Image 1 of the size of 32*30, it becomes an image of a size of 30*30 after being translated to the left for two pixels; and the to-be-tested Image 2 of the size of 32*30 is obtained by adding two column data after the far right of the 30*30 image; and the two column data added after the far right can be the same as that of the 30th column data in the 30*30 image. For the to-be-tested Image 1 of the size of 32*30, by translating this image to the left for three pixels and so on until it is being translated to the left for five pixels, to-be-tested Image 1, to-be-tested Image 2, to-betested Image 3, to-be-tested Image 4, to-be-tested Image 5, and to-be-tested Image 6 can be obtained. Through processing of the to-be-tested Images 1, 2, 3, 4, 5, and 6 by using the convolutional neural network, eigenvectors corresponding to these six different to-be-tested images can be obtained respectively; and the respective eigenvectors corresponding to the to-be-tested Images 1, 2, 3, 4, 5, and 6 are combined to obtain the second eigenvector.

As many convolution operations are shared in the respective processing of the to-be-tested Images 1, 2, 3, 4, 5, and 6 when using the convolutional neural network, the calculation speed is greatly improved, and the predicting process is accelerated.

For Step 302, in the process of performing word segmentation on the to-be-tested image by making use of the just obtained word spacing probability value or non-word spacing probability value, two methods are included as follows: in the first method, a probability value result graph is obtained by taking the position of the to-be-tested image corresponding to the second eigenvector as the X coordinate and taking the word spacing probability value corresponding to the second eigenvector as the Y coordinate; a position of the maximum value of the word spacing probability value is found from the probability value result graph; and word segmentation is carried out for the to-be-tested image by using the position of the maximum value; alternatively, in the second method, a probability value result graph is obtained by taking the position of the to-be-tested image corresponding to the second eigenvector as the X coordinate and taking the non-word spacing probability value corresponding to the second eigenvector as the Y coordinate; a position of the minimum value of the non-word spacing probability value is found from the probability value result graph; and word segmentation is carried out for the to-be-tested image by using the position of the minimum value.

The process where the position of the to-be-tested image corresponding to the second eigenvector is taken as the X coordinate and the word spacing probability value/non-word spacing probability value corresponding to the second eigenvector is taken as the Y coordinate, is a process where the corresponding position of a plurality of eigenvectors matching the second eigenvector in the to-be-tested image is taken as the X coordinate and the word spacing probability value/non-word spacing probability value corresponding to the first eigenvector is taken as the Y coordinate.

The processing of the first and second methods are similar. In what follows, the first processing method is taken as an example.

Figure 5:
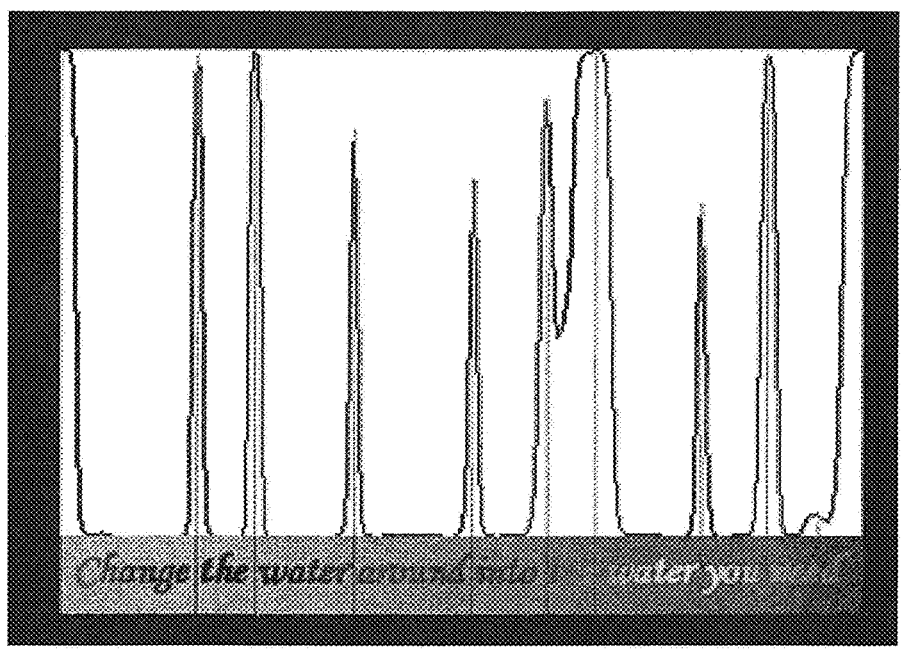
FIG. 5 is a schematic diagram of a probability value result graph according to an embodiment of the present invention.

For the first method, after obtaining the word spacing probability value corresponding to the second eigenvector, the position of the to-be-tested image corresponding to the second eigenvector can be used as the X coordinate, and the word spacing probability corresponding to the second eigenvector can be used as the Y coordinate. A probability value result graph is obtained as shown in FIG. 5 by taking the position of a plurality of first eigenvectors matching the second eigenvector in the to-be-tested image as the X coordinate and by taking the word spacing probability value corresponding to each first eigenvector as the Y coordinate. In FIG. 5, the probability value indicates the probability of the current position being word spacing. The larger the probability value is, the more likely a current position is a word spacing. As such, the position of the maximum value of the word spacing probability can be found from the probability value result graph, and word segmentation for the to-be-tested image can be performed by making use of the position of the maximum value.

In an embodiment, these positions of maximum values, i.e., the position of the vertical line in FIG. 5, can be found with the non-maximum suppression algorithm. The non-suppression algorithm has been widely used in computer vision field; details will not be provided herein. After these positions of maximum values are found, the to-be-tested image can be segmented at the positions of maximum values to obtain small images of a single word. In this way, the to-be-tested image will be segmented into a plurality of small images; each small image will only include one word; and one single word will not be segmented into a plurality of small images.

When the above method is applied into text recognition tasks, it is necessary to translate the words and sentences. After the to-be-tested image is segmented into a plurality of small images with the above method, word recognition is carried out for each small image; the recognition results of the plurality of words are put together with spaces, and then words and sentences are translated.

In an embodiment of the present invention described above, both the sample image and the to-be-tested image are an image having a single line, and the single line includes a plurality of images that include words. Additionally, words contained therein include, but are not limited to, English words, Japanese words, German words, Russian words, French words, words used by minority, etc.

In accordance with embodiments of the present invention, word segmentation on an image is performed with the convolutional neural network, which can effectively segment an image having a plurality of words into a plurality of small images to ensure that each small image contains only one word; and one single word will not be segmented into a plurality of small images, thereby achieving accurate word segmentation. As a result, the present invention is able to improve the accuracy of word segmentation, increase the speed of word segmentation, and implement a fast and accurate detecting of the text areas in an image, which in turn improves the user experience.

Figure 6:
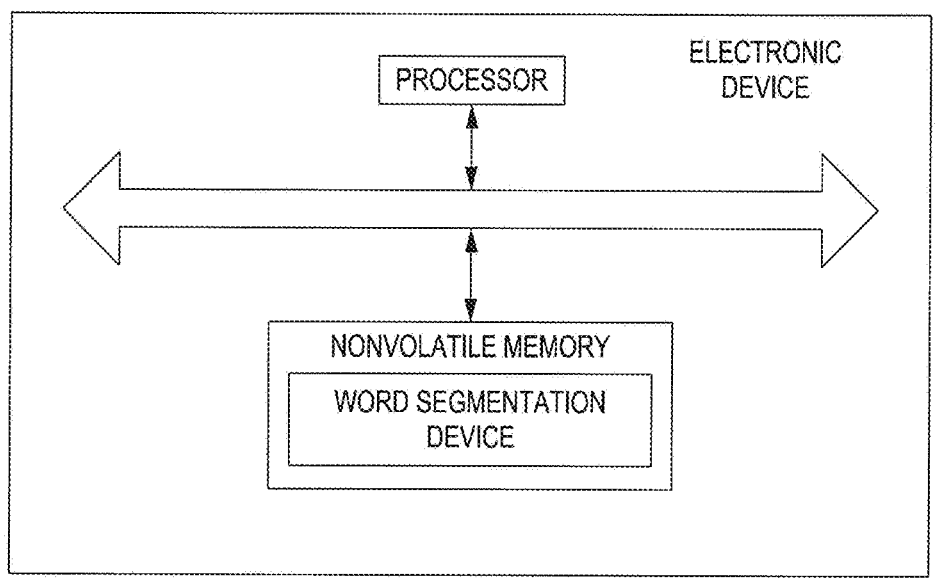
FIG. 6 is a hardware structure diagram of an electronic device according to an embodiment of the present invention.

Based on the concept presented in the above system and method of the present invention, embodiments of the present invention provide a word segmentation device, which can be applied to electronic devices. The word segmentation device can be implemented through software, and can be further implemented through hardware or a combination of software and hardware. When software implementation is used as an example, as a logic device, it is formed by the processor reading corresponding computer program commands in a nonvolatile memory, wherein the processor is provided on the electronic device where the word segmentation device locates. At the level of hardware, as shown in FIG. 6, it is a hardware structure chart of an electronic device where the word segmentation device disclosed by the present application locates. Other than the processor and nonvolatile as shown in FIG. 6, the electronic device may further be configured with other types of hardware, such as a transfer chip for processing messages, a network interface and a memory. At the level of hardware structure, this electronic device may also be a distributed device, which may include a plurality of interface cards for implementing the extension of message processing at the level of hardware.

Figure 7:
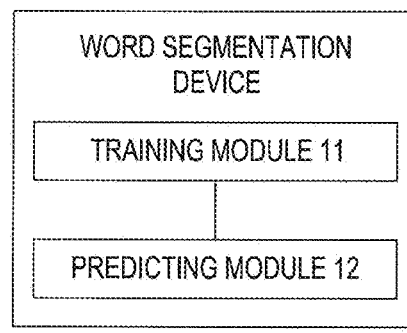
FIG. 7 is a schematic structural diagram of a word segmentation device according to an embodiment of the present invention.

As shown in FIG. 7, a structure chart of the word segmentation device disclosed by the present invention is illustrated; and the device comprises:

a training module 11, configured to acquire a sample image, the sample image comprising a word spacing marker or a non-word spacing marker; processing the sample image with a convolutional neural network to obtain a first eigenvector corresponding to the sample image, a word spacing probability value and/or a non-word spacing probability value corresponding to the first eigenvector; and a predicting module 12, configured to acquire a to-be-tested image, and processing the to-be-tested image with the convolutional neural network to obtain a second eigenvector corresponding to the to-be-tested image, a word spacing probability value or a non-word spacing probability value corresponding to the second eigenvector; and performing word segmentation on the to-be-tested image by using the just obtained word spacing probability value or the non-word spacing probability value.

The training module 11 is configured to extract at least two letter images from a font library in a process of acquiring the sample image, splicing the at least two letter images together to obtain a spliced image, and setting a word spacing marker or a non-word spacing marker for the spliced image; and mark the spliced image as the sample image or perform one of the following operations or any combination thereof on the spliced image: a translation operation, a rotation operation, a stretching operation, adding Gaussian noise, and mark the image on which the operation is performed as the sample image.

In an embodiment, training module 11 is further configured to convert the sample image into a gray scale sample image before processing the sample image by using the convolutional neural network; and convert the gray scale sample image into a sample image of a size of M*N; and normalize the sample image of the size of M*N; the predicting Module 12 is further configured to convert the to-be-tested image into a gray scale, to-be-tested image before processing the to-be-tested image with the convolutional neural network; convert the gray scale, to-be-tested image into a to-be-tested image of a size of M*L; and normalize the to-be-tested image of the size of M*L, wherein M is a positive integer; N is a positive integer; L is a positive integer, and the ratio of M to L is the same as the aspect ratio of the to-be-tested image.

In an embodiment, the predicting module 12 is configured to do the following: in a process of processing the to-be-tested image with the convolutional neural network to obtain a second eigenvector corresponding to the to-be-tested image, translate the to-be-tested image to the left K times or to the right K times, wherein each translation has a different translational position so that K+1 different to-be-tested images are obtained, and the number K is a positive integer; and process the different K+1 to-be-tested images with the convolutional neural network to obtain K+1 eigenvectors corresponding to the to-be-tested images, and combine the obtained K+1 eigenvectors respectively corresponding to the to-be-tested images to obtain a second eigenvector corresponding to the to-be-tested image.

In an embodiment, the predicting module 12 is configured to do the following: in a process of obtaining the word spacing probability value or the non-word spacing probability value corresponding to the second eigenvector, obtain a plurality of first eigenvectors matching the second eigenvector by using the convolutional neural network, and take the word spacing probability value or the non-word spacing probability value corresponding to the plurality of first eigenvectors as the word spacing probability value or the non-word spacing probability value corresponding to the second eigenvector.

In an embodiment, the predicting module 12 is configured to do the following: in a process of performing word segmentation on the to-be-tested image by using the just obtained word spacing probability value or non-word spacing probability value, obtain a probability value result graph by using a position of the to-be-tested image corresponding to the second eigenvector as an X coordinate and using the word spacing probability value corresponding to the second eigenvector as a Y coordinate; finding a position of a maximum value of the word spacing probability value from the probability value result graph, and performing word segmentation on the to-be-tested image by using the maximum value position; alternatively, obtaining the probability value result graph by taking the position of the to-be-tested image corresponding to the second eigenvector as the X coordinate and taking the non-word spacing probability value corresponding to the second eigenvector as the Y coordinate; finding a position of a minimum value of the non-word spacing probability value from the probability value result graph, and performing word segmentation on the to-be-tested image by using the minimum value position.

In accordance with embodiments of the present invention, word segmentation on an image is performed with the convolutional neural network, which can effectively segment an image having a plurality of words into a plurality of small images to ensure that each small image contains only one word; and one single word will not be segmented into a plurality of small images, thereby achieving accurate word segmentation. As a result, the present invention is able to improve the accuracy of word segmentation, increase the speed of word segmentation, and implement a fast and accurate detecting of the text areas in an image, which in turn improves the user experience.

In the process, various modules of the device disclosed in the present invention can also be configured separately. The above modules may be combined into one module, or further divided into multiple sub-modules.

By the preceding description of embodiments, those skilled in the art will clearly understand that the present invention may be implemented by software plus a general hardware platform, and by hardware. Based on such understanding, embodiments of the present invention may be embodied in the form of a software product. The computer software product is stored in a storage medium and includes several instructions for instructing a computer device (which may be a personal computer, a server, a network apparatus, or the like) to perform the methods described in embodiments of the present invention. Those skilled in the art will understand that the accompanying drawings are schematic diagrams of preferred implementations, modules or processes in the accompanying drawings are not necessarily mandatory for implementing the present invention.

Those skilled in the art will also understand that the modules in the device of the embodiment can be allocated in a device based on the description of embodiments herein, and further can be arranged in one or more devices of the embodiments through corresponding changes. The modules of the foregoing embodiments may be combined into one module, or further divided into multiple sub-modules. The aforementioned sequence numbers of the embodiments of the present invention are merely for the convenience of description, and do not imply a preference among embodiments.

Disclosed above are embodiments of the present invention. However, the present invention is not limited thereto, and any equivalent or obvious variations that conceivable by those skilled in the art shall fall within the protection scope of the present claims.

The invention claimed is:

1. In an optical character recognition ("OCR") system, a word segmentation method, comprising:
   acquiring a sample image comprising a word spacing marker or a non-word spacing marker;
   processing the sample image with a convolutional neural network to obtain a first eigenvector corresponding to the sample image, a word spacing probability value and/or a non-word spacing probability value corresponding to the first eigenvector;
   acquiring a to-be-tested image, and processing the to-be-tested image with the convolutional neural network to obtain a second eigenvector corresponding to the to-be-tested image, a word spacing probability value or a non-word spacing probability value corresponding to the second eigenvector; and
   performing word segmentation on the to-be-tested image by using the just obtained word spacing probability value or the non-word spacing probability value.

2. The OCR system according to claim 1, wherein acquiring the sample image comprises:
   extracting at least two letter images from a font library, splicing the at least two letter images together to obtain a spliced image, and setting a word spacing marker or a non-word spacing marker for the spliced image; and
   marking the spliced image as the sample image or performing one of the following operations or any combination thereof on the spliced image: a translation operation, a rotation operation, a stretching operation, adding Gaussian noise, and marking the image on which the operation is performed as the sample image.

3. The OCR system according to claim 1, wherein the method further comprises:
   before processing the sample image with the convolutional neural network, converting the sample image into a gray scale sample image, converting the gray scale sample image into a sample image with a size of M*N, and normalizing the sample image with the size of M*N; and
   before processing the to-be-tested sample image with the convolutional neural network, converting the to-be-tested image into a gray scale, to-be-tested image, converting the gray scale, to-be-tested image into a to-be-tested image with a size of M*L, and normalizing the to-be-tested image with the size of M*L,
   wherein the number M is a positive integer, the number N is a positive integer, and L is a positive integer; and a ratio of the number M and the number L is the same as an aspect ratio of the to-be-tested image.

4. The OCR system according to claim 1, wherein processing the to-be-tested image with the convolutional neural network to obtain a second eigenvector corresponding to the to-be-tested image comprises:
   translating the to-be-tested image to the left K times or to the right K times, wherein each translation has a different translational position so that K+1 different to-be-tested images are obtained, and the number K is a positive integer; and
   processing the different K+1 to-be-tested images with the convolutional neural network to obtain K+1 eigenvectors corresponding to the to-be-tested images, and combining the obtained K+1 eigenvectors respectively corresponding to the to-be-tested images to obtain a second eigenvector corresponding to the to-be-tested image.

5. The OCR system according to claim 1 or 4, wherein obtaining the word spacing probability value or the non-word spacing probability value corresponding to the second eigenvector comprises:
   obtaining a plurality of first eigenvectors matching the second eigenvector by using the convolutional neural network, and taking the word spacing probability value or the non-word spacing probability value corresponding to the plurality of first eigenvectors as the word spacing probability value or the non-word spacing probability value corresponding to the second eigenvector.

6. The OCR system according to claim 1 or 4, wherein performing word segmentation on the to-be-tested image by using the just obtained word spacing probability value or the non-word spacing probability value comprises:
   obtaining a probability value result graph by using a position of the to-be-tested image corresponding to the second eigenvector as an X coordinate and using the word spacing probability value corresponding to the second eigenvector as a Y coordinate;
   finding a position of a maximum value of the word spacing probability value from the probability value result graph, and performing word segmentation on the to-be-tested image by using the maximum value position; alternatively, obtaining the probability value result graph by taking the position of the to-be-tested image corresponding to the second eigenvector as the X coordinate and taking the non-word spacing probability value corresponding to the second eigenvector as the Y coordinate; and
   finding a position of a minimum value of the non-word spacing probability value from the probability value result graph, and performing word segmentation on the to-be-tested image by using the minimum value position.

7. A word segmentation device comprising a processor adaptable for reading computer instructions and executing program commands, wherein the processor is configured to
   execute a training module comprising software instructions configured to acquire a sample image, the sample image comprising a word spacing marker or a non-word spacing marker, and process the sample image with a convolutional neural network to obtain a first eigenvector corresponding to the sample image, a word spacing probability value and/or a non-word spacing probability value corresponding to the first eigenvector; and
   execute a predicting module comprising software instructions, configured to acquire a to-be-tested image and process the to-be-tested image with the convolutional neural network to obtain a second eigenvector corresponding to the to-be-tested image, a word spacing probability value or a non-word spacing probability value corresponding to the second eigenvector; and
   perform word segmentation on the to-be-tested image by using the just obtained word spacing probability value or the non-word spacing probability value.

8. The device according to claim 7, wherein
   the training module is configured to extract at least two letter images from a font library in a process of acquiring the sample image, splice the at least two letter images together to obtain a spliced image, and set a word spacing marker or a non-word spacing marker for the spliced image; and
   mark the spliced image as the sample image or perform one of the following operations or any combination thereof on the spliced image: a translation operation, a rotation operation, a stretching operation, adding Gaussian noise, and mark the image on which the operation is performed as the sample image.

9. The device according to claim 7, wherein the training module is further configured to do the following: before the sample image is processed with the convolutional neural network, convert the sample image into a gray scale sample image, convert the gray scale sample image into a sample image with a size of M*N, and normalize the sample image with the size of M*N; and the predicting module is further configured to do the following: before the to-be-tested sample image is processed with the convolutional neural network, convert the to-be-tested image into a gray scale, to-be-tested image, convert the gray scale, to-be-tested image into a to-be-tested image with a size of M*L, and normalize the to-be-tested image with the size of M*L, wherein the number M is a positive integer, the number N is a positive integer, and L is a positive integer; and a ratio of the number M and the number L is the same as an aspect ratio of the to-be-tested image.

10. The device according to claim 7, wherein the predicting module is configured to do the following: in a process of processing the to-be-tested image with the convolutional neural network to obtain a second eigenvector corresponding to the to-be-tested image, translate the to-be-tested image to the left K times or to the right K times, wherein each translation has a different translational position so that K+1 different to-be-tested images are obtained, and the number K is a positive integer; and process the different K+1 to-be-tested images with the convolutional neural network to obtain K+1 eigenvectors corresponding to the to-be-tested images, and combine the obtained K+1 eigenvectors respectively corresponding to the to-be-tested images to obtain a second eigenvector corresponding to the to-be-tested image.

11. The device according to claim 7 or 10, wherein the predicting module is configured to do the following: in a process of obtaining the word spacing probability value or the non-word spacing probability value corresponding to the second eigenvector, obtain a plurality of first eigenvectors matching the second eigenvector by using the convolutional neural network, and take the word spacing probability value or the non-word spacing probability value corresponding to the plurality of first eigenvectors as the word spacing probability value or the non-word spacing probability value corresponding to the second eigenvector.

12. The device according to claim 7 or 10, wherein the predicting module is configured to do the following: in a process of performing word segmentation on the to-be-tested image by using the just obtained word spacing probability value or non-word spacing probability value, obtain a probability value result graph by using a position of the to-be-tested image corresponding to the second eigenvector as an X coordinate and using the word spacing probability value corresponding to the second eigenvector as a Y coordinate;

find a position of a maximum value of the word spacing probability value from the probability value result graph, and perform word segmentation on the to-be-tested image by using the maximum value position;

alternatively, obtain the probability value result graph by taking the position of the to-be-tested image corresponding to the second eigenvector as the X coordinate and taking the non-word spacing probability value corresponding to the second eigenvector as the Y coordinate; and find a position of a minimum value of the non-word spacing probability value from the probability value result graph, and perform word segmentation on the to-be-tested image by using the minimum value position.

* * * * *